(No Model.)
W. J. MÜLLER.
APPARATUS FOR KNEADING DOUGH AND SHAPING IT INTO LOAVES.
No. 479,827. Patented Aug. 2, 1892.
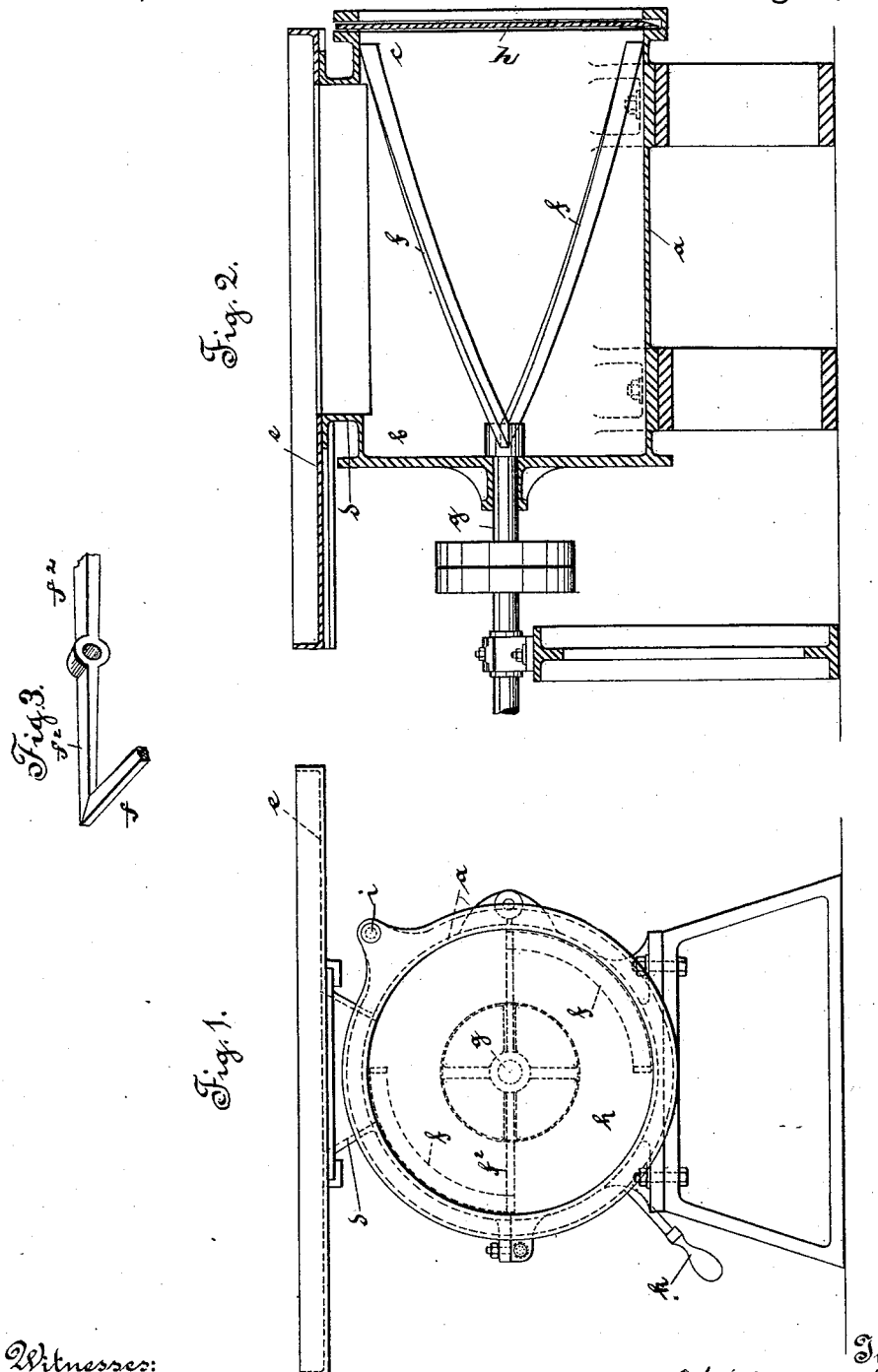

UNITED STATES PATENT OFFICE.

WILHELM JULIUS MÜLLER, OF EHRENBERG, GERMANY.

APPARATUS FOR KNEADING DOUGH AND SHAPING IT INTO LOAVES.

SPECIFICATION forming part of Letters Patent No. 479,827, dated August 2, 1892.

Application filed December 30, 1891. Serial No. 416,578. (No model.)

*To all whom it may concern:*

Be it known that I, WILHELM JULIUS MÜLLER, a subject of the Emperor of Germany, residing at Ehrenberg, in Germany, have invented certain new and useful Improvements in Apparatus for Kneading Dough and Shaping it into Loaves, of which the following is a specification.

It is a well-known fact that in making bread considerable time is lost in forming or shaping the dough into loaves, the services of a special workman being in most cases requisite for the purpose.

The object of this invention is to provide means for performing this part of the baker's work by machinery and in a very short time.

The invention consists of a cylindrical trough or receptacle open and surmounted on one side by a hopper and provided with a door or equivalent at one end and internally with a rotating fork, the arms of which have surfaces representing parts of convolutions of a steep-pitched screw. This fork is adapted to engage the dough fed through the hopper and to knead it thoroughly and spin it out, as it were, into a long roll, which comes out of the cylinder through its open end. At or near this opening of the cylinder a knife connected with the door is arranged to be reciprocated periodically either by hand or by machinery, so that as soon as a piece of dough sufficient to form a loaf has issued from the trough it is cut off by the said knife. The cylinder or trough is then closed by the sliding lid, and while it remains closed the machine may knead a fresh supply of dough. Each section thus severed from the roll of dough has practically the shape of a loaf and only requires being rounded off at the corners or pressed into a suitable mold. One of the chief advantages of the machine is that while forming the dough into a continuous roll, as stated, it also increases and equalizes its compactness through the additional kneading operation it performs. By means of this machine one operative may readily carry out the whole process of preparing the loaves for the oven from the initial stage, in which the dough is first prepared and kneaded, up to the last or baking stage.

In the accompanying drawings, Figure 1 is an end elevation, and Fig. 2 a longitudinal vertical section through the center of the machine, with the mixer and its driving mechanism in elevation. Fig. 3 is a detail perspective of a section of one of the kneading-arms and its supporting-arm.

$a$ is the cylindrical receptacle or trough, closed at $b$, but open at $c$. A hopper $d$ is preferably cast in one piece with the said trough and surmounted by a plate or tray $e$, upon which a provision batch or charge of dough may be placed. To facilitate the cleaning of the apparatus, it is made divisible along a central longitudinal line, both sections being hinged together at one side and fixed with screws on the other side.

The fork or mixer $f$ consists of a stock or cross-head $f^2$, mounted on the driving-shaft $g$, and two arms secured to or formed by the ends of the said cross-head, whose surfaces represent parts of convolutions of a steep-pitched screw and which extend nearly throughout the length of the cylinder $a$. The driving-shaft $g$ may be operated by hand or by power, if available—as, for example, where kneading-machines are usually employed.

$h$ is the lid or door, pivoted at $i$ and adapted to be operated by means of the handle $k$, though, if preferred, it may be automatically operated in any well-known manner.

Provision may be made for the operative to be able to ascertain by sight or hearing when the machine has performed a certain number of revolutions corresponding to a given length of the dough-roll, so that he may see that the door $h$ is shut in time.

I claim—

In a machine for kneading and shaping loaves of dough, the combination, with the cylindrical casing open at one end and having the hopper at the top, of the power-shaft journaled in the closed end of the cylinder, the kneader or agitator carried by said shaft and having the arms projecting toward the open end, and the cut-off lid or door working across and closing the open end of the cylinder, whereby the dough may be severed into loaves and the dough retained in the casing when requiring extra kneading, substantially as described.

In witness whereof I have hereto set my hand in the presence of the two subscribing witnesses.

WILHELM JULIUS MÜLLER.

Witnesses:
    OTTO WOLFF,
        *Patent Agent, of Dresden.*
    HUGO DUMMER,
        *Engineer, of Dresden.*